Figure 2A:
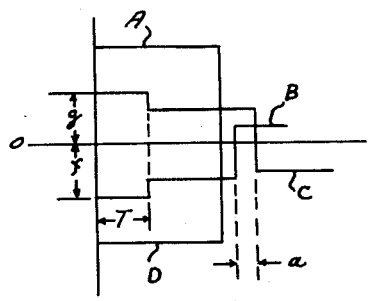

July 19, 1960  F. W. MARSCHALL  2,945,962
PULSE AMPLITUDE WIDTH DISCRIMINATOR
Filed May 20, 1959  2 Sheets-Sheet 1
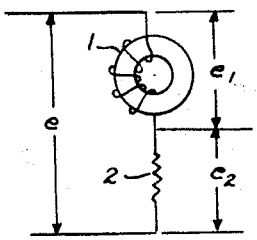
Fig-1a
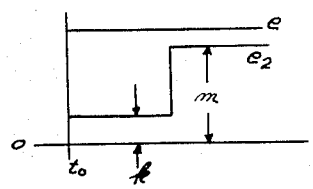
Fig-1b
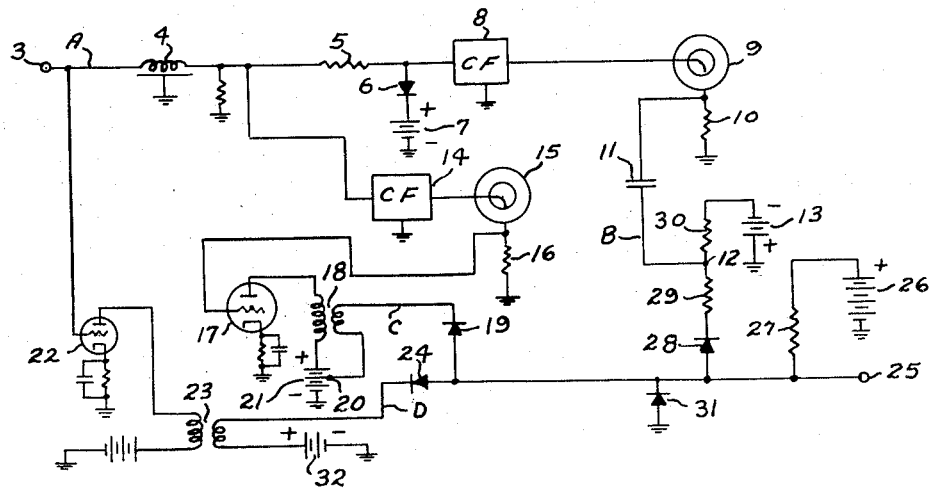
Fig-1c
Fig-1d
Fig-3
INVENTOR.
F.W. MARSCHALL
BY Wade
ATTORNEY
James
AGENT United States Patent Office
2,945,962
Patented July 19, 1960

2,945,962

PULSE AMPLITUDE WIDTH DISCRIMINATOR

Frederick William Marschall, Turin Road M.R., Rome, N.Y.

Filed May 20, 1959, Ser. No. 814,652

3 Claims. (Cl. 307—88)

(Granted under Title 35, U.S. Code (1952), sec. 266)

The invention described herein may be manufactured and used by or for the United States Government for governmental purposes without payment to me of any royalty thereon.

This invention relates to signal selective circuits and particularly to a circuit capable of selecting pulses lying within predetermined amplitude and width ranges and rejecting all others.

The invention will be described in detail with reference to the accompanying drawings in which Figs. 1a–1d illustrate the manner in which saturable core reactors are utilized in the invention, Figs. 2a–2e are waveforms illustrating the principle of operation of the invention, and Fig. 3 is a schematic diagram of a discriminator incorporating the invention.

Consider a toroidal saturable core reactor 1, Fig. 1a, connected in series with a resistor 2. The applied voltage $e$ will be divided between the reactor and the resistor in proportion to their impedances. At any given instant the reactor will have an equivalent resistance $R_e$ in ohms of (1) $$R_e = 4\pi 10^{-9} \frac{N^2 S}{l} \frac{dB/dt}{H}$$

where N is the number of turns, S is the cross-sectional area in square centimeters, $l$ is the mean circumference in centimeters, $t$ is time in seconds, H is the magnetizing intensity in oersteds and B is the flux density in maxwells/square centimeter. As can be seen from Equation 1 the nature of $R_e$ will be a function of the type of excitation and the magnitude of the series resistor as well as the physical and electrical parameters N, S, $l$ and the B—H curve.

Assume the circuit of Fig. 1a to be impressed with a voltage $e$ at $t_0$. The waveform of the voltage $e_2$ across resistor 2 will be of the type shown in Fig. 1b. If the impressed voltage had had a value of 2e the waveform would have appeared as in Fig. 1c while for an impressed voltage of $e/2$ the waveform would have been as shown in Fig. 1d. Prior to saturation of the core the reactor has the equivalent resistance given by Equation 1 and during this time the voltage drop across resistor 2 has the value $k$. When the core saturates, the flux change, i.e. $dB/dt$ in Equation 1, becomes zero and the equivalent resistance of the reactor falls to the resistance of the winding which is comparatively low. Therefore, when the core saturates, the voltage drop across the reactor abruptly drops causing a sharp rise in the voltage $e_2$ to the value $m$ which is equal to $e$ minus the IR drop of the reactor winding. The magnitude of $k$ will depend upon the magnitude of $e$ and the parameters of Equation 1. The final magnitude of $e_2$ and the time at which $e_2$ changes magnitude from $k$ to $m$ will be a function of the magnitude of $e$. A variation of the input voltage magnitude can be detected as a variation in the time at which wave-form $e_2$ changes from $k$ to $m$. Thus the saturable core reactor can be used as a time interval generating device.

The pulse amplitude-width discriminator in accordance with the invention utilizes the time interval generating feature of saturable core reactors. The principle upon which the discriminator operates is illustrated in Figs. 2a–2e. In these figures waveform A represents the input to a discriminator having two saturable core reactor and resistor circuits of the type shown in Fig. 1a. Waveform D is waveform A inverted. Let the input to one of the circuits be limited and delayed by equal interval T, and let this circuit be designed so that the waveform across the resistor is as shown at B. Let the input to the other circuit also be delayed by the interval T and let the circuit be designed so as to produce a waveform which, when inverted, is as shown at C. Further, let waveform B be biased above the reference voltage by an amount $g$ and waveform C below the reference voltage by an amount $f$. Finally, let the circuit have an output only if, at some time not lying within the interval defined by pulse D, both B and C are positive relative to the $o$ reference.

Figure 2B:
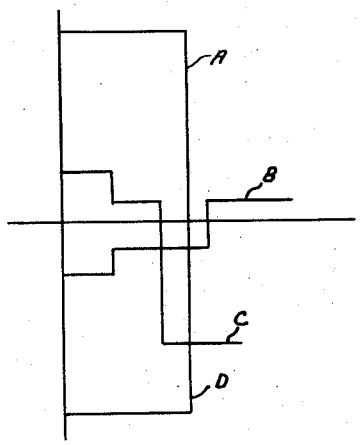
Figure 2C:
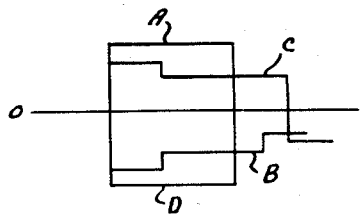
Figure 2D:
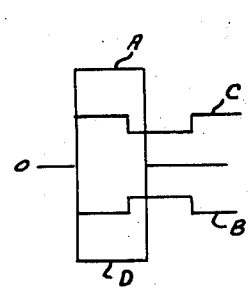
Figure 2E:
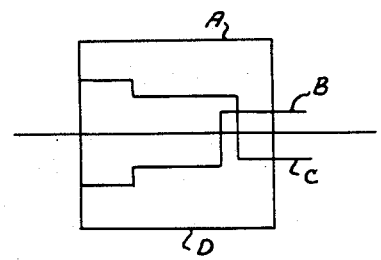

Fig. 2a illustrates a situation where an output will be produced since, during interval "$a$" which lies outside pulse D, both B and C are positive relative to the reference potential. Fig. 2b illustrates a situation where the amplitude of input pulse A is increased over the amplitude in Fig. 2a. Since, as pointed out above, the amplitude of the input to the circuit producing waveform B is limited, this waveform does not change. However, the increased amplitude reduces the delay produced by the other circuit so that waveform C goes negative before waveform B goes positive so that no output is produced. Fig. 2c illustrates the situation where A is reduced in amplitude. This prevents waveform B from ever going positive so that the condition that both B and C be positive at the same time is not fulfilled. Similarly, the reduced width or duration of pulse A in Fig. 2d prevents waveform B from reaching the reference axis and no output is produced. Finally, Fig. 2e represents the situation where the width of pulse A is increased. This produces no change in waveforms B and C from Fig. 2a but increases correspondingly the width of waveform D so that the period during which B and C are positive does not lie outside the interval defined by pulse D as required for an output to be produced. Consequently, no output results in the situation illustrated in Fig. 2e.

From the above it seems that an output will be produced by the circuit only when the input pulse A lies within predetermined amplitude and width ranges. Fig. 3 shows schematically a circuit operating on the above principle.

Referring to Fig. 3, the input pulse A is applied to input terminal 3 and thence to delay line 4 producing the delay T (Fig. 2a). The delayed pulse A is applied to a limiter consisting of resistor 5 and biased diode 6 which limits the amplitude of the pulse to the voltage of source 7. The limited pulse is applied through cathode follower stage 8 to a saturable core reactor and resistor circuit, of the type shown in Fig. 1a, consisting of saturable core reactor 9 and resistor 10. The waveform B (Fig. 2a) is developed across resistor 10 and is applied through blocking condenser 11 to point 12 which is maintained at the proper negative bias $f$ (Fig. 2a) by source 13.

The delayed input pulse A is also applied through cathode follower stage 14 to a second reactor-resistor circuit comprising saturable core reactor 15 and resistor 16. The waveform developed across resistor 16 is inverted by vacuum tube stage 17 and applied through pulse transformer 18 to the cathode of diode 19 as waveform C (Fig. 2a). The proper positive bias for waveform C is provided by a tap 20 on source 21.

The undelayed input pulse A is inverted by vacuum tube stage 22 and applied through pulse transformer 23 to the cathode of diode 24 as waveform D (Fig. 2a).

As already stated, the required conditions for an output to be produced at output terminal 25 are that B be positive, C be positive and D be non-existent. The potentials of waveforms B and C are with respect to a reference potential which in this case is ground. The remainder of the circuit of Fig. 3 receives the three waveforms B, C and D and insures that an output is produced only under the above stated conditions.

In the absence of an input signal at input terminal A, current flows from source 26 through resistor 27, diode 28, resistor 29, resistor 30 and source 13 to ground. The parameters of this circuit are so adjusted that the potential drop across resistor 27 would, in the absence of diode 31, be sufficient to at least drop the potential of terminal 25 to ground potential. Since clamping diode 31 prevents terminal 25 from falling below ground potential, this terminal has zero or ground potential in the absence of an input signal. Also with terminal 25 at ground potential, diodes 19 and 24 are nonconducting due to the positive potentials on their cathodes.

Consider first the situation where B is positive and C is not positive, assuming D to be nonexistent. With point 12 positive diode 28 becomes nonconductive and terminal 25 would tend to rise due to the reduced voltage drop across resistor 27. However, with C not positive, the cathode of diode 19 is not positive and therefore the anode of this diode, which is common with terminal 25, is prevented from rising into the positive region. Similarly, with C positive and B not positive, the positive potential of the cathode of diode 19 would permit its anode and terminal 25 to rise into the positive region except that point 12 and therefore the cathode of diode 28 are at ground or lower potential which prevents the anode of the diode and terminal 25 from rising above ground potential. If B and C are both positive, however, the cathodes of both diodes 19 and 28 are positive which permits their anodes, which are common with terminal 25, to rise into the positive region and produce an output signal.

The foregoing assumed waveform D to be nonexistent. In this case the cathode of diode 24 is biased positively by the potential of source 32 so that this diode does not conduct until an equal rise in its anode potential, and that of terminal 25 occurs. An output is therefore possible. During the presence of pulse D, however, no output can occur under any circumstances. The parameters of the circuit are adjusted so that pulse D, as it appears across the secondary of transformer 23, has a magnitude at least equal to and preferably greater than the voltage of source 32. Therefore, during the existence of pulse D, the cathode of diode 24 is at ground or below ground potential which prevents a rise in its anode potential, and that of terminal 25, above ground. Consequently, an output is not possible in the presence of pulse D.

I claim:

1. An amplitude-width discriminator for serially applied input pulses comprising; first and second series circuits each consisting of a saturable core reactor and a resistor; means for limiting said input pulses to a predetermined magnitude and for applying said limited pulses to said first series circuit to produce a first voltage waveform across the resistor of said series circuit; means for applying said input pulses without magnitude limitation to said second series circuit and means for inverting the resulting voltage across the resistor of said series circuit to produce a second voltage waveform; means for biasing said first voltage waveform relative to a predetermined reference potential; means for biasing said second voltage waveform relative to said reference potential and oppositively with respect to the bias of said first waveform; means for inverting said input pulses; and means responsive to said first and second waveforms and said inverted input pulses to produce an output signal whenever at any instant not concurrent with an inverted input pulse said first and second waveforms have like polarities relative to said reference potential.

2. An amplitude-width discriminator for serially applied input pulses that are positive relative to a predetermined reference potential, said discriminator comprising; first and second series circuits each consisting of a saturable core reactor and a resistor; means for limiting said input pulses to a predetermined magnitude and for applying said limited pulses to said first series circuit to produce a first voltage waveform across the resistor of said series circuit; means for applying said input pulses without magnitude limitation to said second series circuit and means for inverting the resulting voltage across the resistor to produce a second voltage waveform; means for biasing said first voltage waveform negatively relative to said reference potential; means for biasing said second voltage waveform positively relative to said reference potential; means for inverting said input pulses; and means responsive to said first and second waveforms and said inverted input pulses to produce an output signal whenever at any instant not concurrent with an inverted input pulse said first and second waveforms are positive relative to said reference potential.

3. Apparatus as claimed in claim 2 in which said last named means comprises an output terminal, clamping means connected between said output terminal and a point at said reference potential, a resistor connected between said output terminal and a point positive relative to said reference potential, a diode having its anode connected to said output terminal and its cathode connected through a resistor to a point negative relative to said reference potential, means for applying said first voltage waveform between a point on the last named resistor and a point at said reference potential, a diode having its anode connected to said output terminal, means for applying said second voltage waveform between the cathode of the last named diode and a point positive relative to said reference potential, a diode having its anode connected to said output terminal, and means for applying said inverted input pulses between the cathode of the last named diode and a point positive relative to said reference potential.

References Cited in the file of this patent
UNITED STATES PATENTS

| | | |
|---|---|---|
| 2,853,634 | Deise | Sept. 23, 1958 |
| 2,866,016 | Weiss | Dec. 23, 1958 |